United States Patent Office 3,635,881
Patented Jan. 18, 1972

3,635,881
VINYL CHLORIDE POLYMERS STABILIZED WITH N-HETEROCYCLIC DISULFIDES
Stanley B. Mirviss, Stamford, Conn., assignor to Stauffer Chemical Company, New York, N.Y.
No Drawing. Filed Oct. 10, 1967, Ser. No. 674,127
Int. Cl. C08f 45/58, 45/60
U.S. Cl. 260—45.8 N
5 Claims

ABSTRACT OF THE DISCLOSURE

A solid polymer composition consisting of a hydrocarbon, a substituted hydrocarbon, a polyester, a vinyl polymer and copolymers and terpolymers thereof, stabilized against ultraviolet light degradation and oxidation caused by heat and air wherein a stabilizing amount of a dicyclic sulfide is intermixed with the polymer or the dicyclic disulfide is used as a synergist in combination with conventional phenolic antioxidants.

BACKGROUND OF THE INVENTION

It is well known that plastics and polymeric materials generally are susceptible to a characteristic type of degradation when exposed to ultraviolet rays and/or heat. Although the effect varies with different materials, it commonly manifests itself initially as a weakening of the tensile strength of the polymer, which on continued exposure becomes increasingly brittle until a point is reached at which mechanical failure occurs. In some instances, the polymer may be transformed into a powdery mass often accompanied by intense darkening.

There have been numerous proposals for producing plastics having increased durability in the presence of ultraviolet radiation and heat. The most familiar of these proposals consists of blending the plastic or polymer with a material which in itself is a strong ultraviolet absorber and an antioxidant. These properties apparently afford protection of the plastic from the damaging radiation and heat. Because of their inherently poor resistance to ultraviolet light and heat, the successful commercialization of synthetic polymers is tied in closely with the development of additives.

Whereas the principal function of ultraviolet stabilizers and antioxidants are that they provide protection of the polymer, certain ancillary features and characteristics are also necessary. It is, for instance, highly important that the additive should not modify or cause adverse changes in the polymer. A particularly vexious characteristic of many plastic additives is their tendency to impart color or strain to the polymer in which they are incorporated, ultraviolet stabilizers and antioxidants being especially prone to this type of behavior. Such side effects cannot be tolerated where a clear or colorless polymer is needed. Even pigmented or dyed plastic materials are detrimentally affected by stabilizer staining since it causes over-all color degradation. Other understandable side effects often encountered are odor production, softening, bleeding and the like. From a commercial standpoint, it is desirable that the additive be readily available or economical to manufacture.

Commercial antioxidants have been developed for this purpose and are generally secondary amines of aromatic compounds or hydroxy aryls which may, in addition to the amino or hydroxy grouping, contain as additional ring substituents one or more branched or normal aliphatic radicals. As is well known, a general requirement of such material is that they contain an antioxidant group such as the secondary amino or the hydroxyl group attached to an aromatic ring, and further, that the group has such a structural position that the stability of the resulting compound is improved by resonance energy. One such antioxidant compound is 4,4-butylidene bis(3-methyl-6-tertiary butyl phenol) which is the active ingredient of an antioxidant sold under the trade name of Santowhite Powder. The addition of these antioxidant materials to the polymeric structure, however, gives only limited effectiveness.

Another method of controlling the antioxidation process was to incorporate into the polymeric material a combination of materials consisting of the well known antioxidant carbon black and a dicyclic disulfide composition. This procedure is outlined in British Pat. No. 836,937. These disulfide compositions are described as completely ineffective with antioxidants other than carbon black. However, carbon black can only be employed if a black color for the end product is feasible. Ultraviolet light stability may be improved by addition of ortho-hydroxybenzophenones or ortho-hydroxylbenzoate esters, such as the salicylate esters or ortho-hydroxybenzophenone. These materials are not completely effective as stabilizers because they are characterized by a tendency to undergo discoloration when exposed to ultraviolet light radiation. In order to obviate the discoloration problem, it has been suggested to incorporate into the mixtures prior to curing, additional compounds which have a tendency to reduce the discoloration upon aging. However, these approaches have not been notably successful.

BRIEF DESCRIPTION OF THE INVENTION

It has been discovered that excellent ultraviolet stabilization of polymers can be achieved without encountering the aforesaid undesirable side effects by incorporating into the polymer a dicyclic disulfide having the following formula:

R—S—S—R' wherein R and R' may be selected from the group consisting of N-morpholinyl, N-piperidyl, N-tetrahydroquinolinyl, N-thiazolidyl, N-piperazyl, N-pyrrolidyl, N-oxazolidyl, N-imidazolyl, N-thiazolones, N-oxazolones, and other N-heterocyclic radicals and S is a sulfur atom. Also, it has been discovered that the dicyclic disulfide compositions may be combined with commercial antioxidants to materially increase the antioxidant effect thereof. Thus, a unique dual purpose stabilizer is provided, i.e., an antioxidant synergist and an ultraviolet stabilizer. Also in combination with a phenolic antioxidant it will stabilize a plastic to all types of degradation.

DETAILED DESCRIPTION OF THE INVENTION

In practicing the present invention, the di-cyclic-disulfide is blended or incorporated into the polymer by any of the conventional methods commonly used for mixing such materials with resins and plastics. A typical procedure comprises milling on heated rolls, although deposition from solvents and dry blending are well known techniques. The di-cyclic disulfides are known chemical entities, the description and preparation of which can be found in the technical and chemical literature. The dicyclic-disulfides useable may be represented by the formula R—S—S—R' wherein R and R' may be selected from the group consisting of N-morpholinyl N-piperidyl, N-tetrahydroquinolinyl, N-thiazolidyl, N-piperazyl, N-pyrrolidyl, N-oxazolidyl, N-imidazolyl, N-thiazolones, N-oxazolones, N-heterocyclic radicals and S is a sulfur atom.

In testing the unique and surprising dual function stabilizers of this invention, it has been found that they are singularly effective in protecting poly-α-olefins, diolefins, copolymers of olefins or olefins and diolefins and other hydrocarbon polymers, polymers of substituted vinyl compounds and polyesters against deterioration due to exposure from ultraviolet radiation and in combination with a phenolic antioxidant will stabilize against heat degradation. The polymer compositions stabilized in accordance with the invention exhibited an extended life expectancy and are much more useful and practical than unstabilized polymers and possess a wide diversity of uses including installations requiring prolonged exposure to sunlight, heat and the elements. Moreover, the di-cyclic disulfide, although inordinately effective as an ultraviolet stabilizer, does not produce any undesirable side effects. Even after test exposure periods exceeding 1000 hours, test samples of polymers showed a slight loss of mechanical strength while remaining substantially free of stain or coloration.

The polymer stabilized as contemplated herein can be cast, extruded, rolled or molded into sheets, rods, tubes, piping, filaments and other shaped articles, including sheets or films ranging from 0.5 to 100 mils in thickness. The polymer compositions of this invention can be applied as coatings to paper, cloth, wire, metal foil and are suitable for manufacture of synthetic fibers and fabrics. Although the quantity of stabilizer is not particularly critical, it is recommended that the concentration based on the weight of the polymer be maintained in the neighborhood of between 0.1 to about 5% by weight.

Additionally, the di-cyclic-disulfide compositions may be employed as a synergistic composition in combination with conventional antioxidant materials containing the well known phenolic groups. Thus, from about 0.1 to about 1% by weight can be employed with conventional antioxidant material. Specific antioxidant compositions that may be employed herewith are 4,4-butylidene bis-(3-methyl 6-tertiary butyl phenol), tertiarybutyl catechol, 2,6-di-tertiary butyl-para-cresol, 2,2'-thio-bis(4-methyl-6-tertiary butyl phenol), 4,4'-thio bis (6-tertiary butyl-meta-cresol, bisphenol A, 2,4-dimethyl-6-tertiary butylphenol, 2,2' - methylenebis(4 - methyl - 6 - tertiarylbutyl phenol) or the like.

The di-cyclic-disulfides as described herein are suitable for stabilizing a wide variety of solid polymer compositions against deterioration brought on by exposure to ultraviolet radiation. In this connection, mention is made of any of the normally solid polymers derived from the polymerization of $\alpha$-monolefinic aliphatic and aryl-substituted aliphatic hydrocarbons containing from 2 to 10 carbon atoms. Typical poly-$\alpha$-olefins include polyethylene, polypropylene, poly(3-methylbutene-1) poly(4-methylbutene-1), poly(4-methylpentene-1) poly(pentene-1), poly(3,3-dimethylbutene-1), poly(4,4-dimethylbutene-1), poly(octene-1), poly(decene-1), polystyrene and the like. Copolymers of such olefins as those prepared from ethylene and propylene or ethylene and the butenes or the like are also protected as are polydiolefins, i.e., polybutadiene or polyisoprene and olefin-diolefin copolymers of the type as butadienestyrene or isobutylene-isoprene copolymers. Polymeric materials prepared from olefins and/or diolefins containing some vinylinic monomers such as acrylonitrile or vinyl chloride as illustrated by the so-called ABS resins, acrylonitrile, butadiene and styrene terpolymers, are considered to be within the scope of this invention as are polymers of substituted vinyl monomers such as vinyl chloride, vinylidene dichloride, vinyl acetate, acrylonitrile and the like. Polyester resins with or without added styrene, divinyl benzene and the like are also stabilized by means of the di-cyclic-disulfides.

The stabilizers of this invention are particularly useful for preventing photo-degradation by ultraviolet light or sunlight of stereo regular polyolefins such as isotactic polypropylene. Isotactic polypropylene is a stereoregular polymer wherein the monomeric units are linked predominantly head to tail with the methyl groups on one side of the helical chain rather than the more common arrangement with methyl groups randomly distributed on both sides of the chain. Moreover, this isotactic or singular arrangement of substituents attached to the chain promotes an orderly alignment of the molecules. Such stereoregular polymers often exhibit a high degree of crystallinity and are more superior in physical properties to atactic polymers having a random distribution of the monomeric units. Stereoblock polymers wherein long segments of the chain are in one configuration or the other and also polymers with amorphous regions are also protected. For a fuller description of such polymers, reference is made to the Scientific American, 197, No. 3, pages 98 to 104 (1957); 205, No. 2, pages 33 to 41 (1961). Amorphous or appreciably amorphous polymers are also stabilized.

Although the molecular weight of polymers varies over wide limits, the stabilizer compounds of this invention are not restricted to any particular molecular weight range of polymer, and in fact it has been found that excellent protection can be realized with polymers having a broad or narrow range. Moreover, the so-called amorphous low molecular weight poly-$\alpha$-olefin waxes or oils are likewise susceptible to stabilization by means of the compound of this invention.

Polyesters which can be protected against ultraviolet radiation by means of the di-cyclic-disulfides are well known chemical entities and are described at length in technical literature and numerous U.S. patents. One type of polyester is derived from the addition polymerization of ethylenically unsaturated organic esters, particularly vinyl ester monomers, and in this connection mention is made of acrylic esters, vinyl esters, and the like. The polymerization is commonly effectuated by contacting the monomer with a polymerization initiator such as an organic peroxide with or without the application of heat.

Another type of polyester which can be stabilized in accordance with this invention is formed by the successive esterification of dicarboxylic acids with polyglycols. The resulting polymeric esters consist of alternate linkages of the dicarboxylic acid and polyglycol residues produced by the elimination of water from between the reactants. The resulting polymers may be linear or cross-linked, depending on the selection of the components. For instance, a diglycol wherein the hydroxyl groups are terminally situated produce a linear type of polyester whereas polyglycols as exemplified by glycerol give rise to a cross-linking polymer formed by reacting glycerol with the dicarboxylic acid, phthalic acid, in the form of its anhydride.

Modifications of polyesters are the well known alkyd resins which are obtained by forming a polyester by reacting a polyglycol and an $\alpha,\beta$-ethylenically unsaturated di or polycarboxylic acid and cross-linking the residual ethylene double bond with a suitable cross-linking agent.

In a more specific and detailed sense, the alkyd resins as above referred to having a plurality of polymerizable $\alpha$, $\beta$-ethylenically unsaturated linkages may be produced by combining together a polyhydric alcohol with a polycarboxylic acid or its anhydride which contains $\alpha,\beta$-ethylenic unsaturation. It is generally understood that the acid or its anhydride includes the designation polycarboxylic acid and such terminology will be understood in the description as herein set forth. Saturated carboxylic acids are also frequently included in the reaction mixture for the purpose of modifying the properties of the resin. From the standpoint of cost, the unsaturated polycarboxylic acids most commonly used are maleic, usually in the form of the anhydride, and fumaric acid. Other $\alpha,\beta$-unsaturated carboxylic acids which may be employed are exemplified by citriconic, itaconic, aconitic and mesaconic acids. The chemical and technical literature can be consulted for the names of other suitable acids. An acid often used for modifying the properties of a polyester resin is phthalic acid, commonly in the form of its anhydride. Other such acids with benzenoid or aromatic unsaturation which behave as saturated acids in that their benzenoid unsaturated structure does not enter into any common ethylenic type polymerization are commonly selected to produce various and particular properties and effects in the alkyd resin. In this connection, reference is made to such acids as isophthalic, adipic, azelaic, tetrachlorophthalic acid, sebacic, suberic, endomethylenetetrahydrophthalic and hexachloroendomethylenetetrahydrophthalic.

As illustrative of the polyhydric alcohols applicable for the synthesis of alkyd resins, mention is made of ethylene glycol, diethylene glycol, propylene glycols, dipropylene glycol, butylene glycol and the like. Here again, the literature may be consulted for the names of the less common polyglycols. It should be pointed out that as with the dicarboxylic acid, a polyhydric alcohol may be selected which is ethylenically unsaturated and thereby giving residual ethylenic double bonds for the purpose of cross-linking the polyester with concomitant modification in physical and chemical properties.

In preparing an alkyd resin, the polycarboxylic acid and appropriate polyhydric alcohol are commonly reacted at elevated temperatures in the presence of an inert atmosphere.

The reaction is normally carried out at a temperature ranging from about 150° C. to about 230° C.; the inert atmosphere is conveniently provided by carbon dioxide or nitrogen gas. Generally, the total number of moles of alcohol exceed the total number of moles of acid by about 5 to 20% since the latter figures are required to effect complete esterification, although the proportions are not critical. A relatively inert organic solvent such as xylene is sometimes useful in carrying out the reaction. Since the reaction is an esterification, water is given off and should be removed from the system. After essentially all of the water has been expelled, any solvent is removed and after the mixture cooled, the appropriate unsaturated monomeric cross-linking agent added. If cross polymerization or linkage is to be prolonged, the presence of a suitable inhibitor is necessary.

Unsaturated monomers suitable for use as cross-linking agents can be selected from a wide variety of polymerizable compounds characterized by the presence of a $CH_2=CH-$ group. Examples of such monomers are styrene, vinyl toluene, methyl acrylate, divinyl benzene, diallylphthalate, dimethyl styrene, methylmethacrylate, vinyl acetate, butadiene, and the like. It is also a common practice to employ special monomers in order to secure particular effects. In this connection, mention is made of triallylcyanurate useful in imparting high heat resistance to the resins, alkylallyldiglycolate for use as a refractive modifier, while dialkylphenylphosphate has been employed to impart fire resistance.

Three groups of components which have been found particularly suitable and convenient for preparing polyesters are: (1) acids such as maleic, fumaric, itaconic, phthalic and the like; (2) alcohols or glycols such as allyl alcohol, ethylene glycol and diethylene glycols; (3) unsaturated hydrocarbons such as styrene, cyclopentadiene and the like. Also polyesters containing an alkenyl aryl cross-linking agent such as diallyl phthalate, and a reaction product of an $\alpha,\beta$-ethylenically unsaturated polycarboxylic acid, such as maleic or fumaric acid, a saturated polycarboxylic acid free of non-benzoid unsaturation, such as phthalic acid and at least one glycol such as ethylene glycol and/or diethylene glycol, may be used.

The amounts of the components useful in preparing polyesters may vary widely. In most instances, approximately two parts by weight of an unsaturated alkyd resin to one part by weight of the monomeric cross-linking agent is suitable, although as above mentioned, the proportions may be varied over wide limits.

Another important polymer which can be stabilized in accordance with this invention is polyvinylchloride. This polymer is commonly produced by the emulsion polymerization using a redox initiator for polymerizing vinyl chloride. One type of polyvinylchloride is the so-called rigid or unplasticized polyvinylchloride and this particular modification of polyvinylchloride can be effectively stabilized by the compounds of the invention. As has been previously pointed out elsewhere herein, the di-cyclic-disulfides are effective as stabilizers either for the polymers themselves or various copolymers and terpolymers and mixtures thereof. One class of polymer compositions which lend itself to stabilization by means of the compounds of the invention is resin mixtures which are blends or copolymers of a plastic such as polystyrene or styrene acrylonitrile copolymer with a rubber, usually a butadiene acrylonitrile copolymer. Such compositions may be intimate physical mixtures of the two components, the so-called poly blends or a true terpolymer, that is an ABS resin possibly produced by block or graph techniques. An example of the latter case is a graph copolymer of styrene or nitrile rubber. Typical compositions include 20 to 30% acrylonitrile, 20 to 30% butadiene and 40 to 60% styrene. The abbreviations ABS are taken from the initial letters of the three monomers.

For a more detailed description of the various polymers, copolymers and terpolymers which are susceptible to stabilization to heat, light and air degradation in accordance with this invention, they are described at great length in the technical and chemical publications. In this connection, reference is made to well known treatises as "Polyester Resins" by J. R. Lawrence, Rhineholt Publication Corporation, New York (1960), and "Textbook of Polymer Science" by F. W. Billmeyer, published by Interscience Publishers, New York (1962).

The following examples illustrate the procedure for preparing stabilized polymer compositions of the invention, although the inclusion of such examples is not to be taken as limiting or otherwise imposing any restriction on the invention, and it is to be understood that variations in practicing the same without departing from the scope or spirit thereof will be apparent to those skilled in the art to which this invention pertains.

EXAMPLE 1

Two samples of 50 grams each of a commercial polypropylene resin was obtained. To one of the samples was added 0.1% by weight of a commercial antioxidant material sold under the trade name of "Santowhite Powder." The antioxidant material was thoroughly blended therewith and then formed into a flat disc under conventional molding conditions. To the second sample was added 0.1% of "Santowhite Power," a conventional antioxidant and 0.2% by weight of N,N'-bis-morpholine disulfide. The second sample was blended thoroughly and then formed into a disc under conventional molding conditions. The two discs so formed were then placed into an oven with forced circulating air and heated to 150° C. for testing under conventional heat aging conditions. The results of this test are as follows:

Table 1

| Composition added to polypropylene resin: | Failure time, hours |
|---|---|
| 0.1% by weight "Santowhite Powder" | 20–30 |
| 0.1% by weight "Santowhite Power"; 0.2% by weight N,N'-bis-morpholine disulfide | 624 |

EXAMPLE 2

In order to compare the oxidant inhibitor of the present invention to other known stabilizers, a sample of 50 grams of commercial polypropylene was obtained and 0.1% by weight of 'Santowhite Powder" and 0.2% by weight of allyl benzyl sulfide was blended therewith. After the materials were completely blended together a disc was molded in the manner as outlined in Example 1 and tested according to the heat aging test as set forth. The failure time for this composition was only twenty-three hours, i.e., the sulfide had no effect.

EXAMPLE 3

The polypropylene materials of Example 1 were reformulated and formed into discs in the manner as set forth. These discs were the subjected to ultraviolet light exposure in a conventional weatherometer machine. The disc without the N-N'-bis-morpholine disulfide incorporated therein failed at 100–300 hours while the second disc having the composition of the present invention incorporated therein failed at 1187 hours.

EXAMPLE 4

The procedure as set forth in Example 3 was repeated in its entirety except a conventional stabilizer, phenol thiazine, was substituted for the N-N'-bis-morpholine disulfide and was subjected to the same ultraviolet testing procedure. The sample failed at 212 hours.

As can be seen from the above examples, the N-N'-bis-morpholine disulfide oxidant inhibitor of the present invention exhibits far superior properties to the commercial polypropylene resins and can uniquely act in two ways to stabilize plastics to all the common causes of degradation, i.e., heat, light and air.

EXAMPLE 5

A dry blend consisting of 0.5% by weight N-N'-bis-morpholine disulfide and 50 grams of unstabilized polypropylene was subjected to compression molding in the usual manner at a temperature of 400° F. for six minutes at 2,000 p.s.i. The blended polymer was compression molded or extruded into a 25 mil sheet and thereafter cut into square samples measuring two inches on the side. A like sample containing no stabilizer was also prepared and tested. The samples were then exposed in a Xenon Arc Weatherometer operating at 6,000 watts. The water cycle was adjusted whereby each sample was subjected to eighteen minutes of water spray at 102 minutes of dry exposure for each two hours of exposure. Exposure damage to the sample of the polypropylene was assessed with respect to change in structural strength. After a period of exposure in excess of 1100 hours, the test sheet of polypropylene showed no signs of brittleness at 180° structure test. Nor was there any evidence at this time of any surface crazing or any coloration or staining. A specimen of unstabilized polypropylene, which was exposed concurrently with the stabilized product, failed the structural test after less than 100 hours exposure time. The weatherometer used in compiling the data and test described herein was purchased from the Atlas Electric Device Company, Chicago, Ill. The instrument is identified as a 6,000 watt Xenon Weatherometer Model 60W. The polypropylene resin as used in the above described example was an unstabilized general purpose, high molecular weight polypropylene of the isotactic or crystalline type. Other commercially available grades of unsaturated isotactic polypropylene resins have been tested in accordance with this procedure with the results obtained being in general agreement.

EXAMPLE 6

The procedure of Example 5 was repeated but substituting polyethylene in lieu of polypropylene. In general, the results paralleled those obtained in Example 5.

EXAMPLE 7

The procedure of Example 5 was repeated except the polypropylene was replaced by polyvinylchloride. In general, the degree of stabilization was comparable to that obtained in the previous example.

EXAMPLE 8

The procedure of Example 5 was repeated but in this case the polymer was a terpolymer obtained by polymerizing a mixture of acrylonitrile, butadiene and styrene. The terpolymer used in this sample was of high impact type, commonly referred to in the trade as ABS polymers. The results obtained were in general agreement with Example 5.

What is claimed is:
1. A solid polymer composition comprising a solid vinyl chloride polymer and, as a stabilizer therefor, a stabilizing quantity of an N-heterocyclic disulfide.
2. The composition according to claim 1 wherein the stabilizer is present in an amount ranging between 0.1 and 5% by weight.
3. The composition according to claim 1 wherein the N-heterocyclic disulfide composition is represented by the formula R—S—S—R', wherein R and R' may be selected from the group consisting of N-morpholinyl, N-piperidyl, N-tetrahydroquinolinyl, N-thiazolidyl, N-piperazyl, N-pyrrolidyl, N-oxazolidyl, N-imidazolyl, and mixtures thereof.
4. The composition in accordance with claim 1 which further includes an antioxidant material selected from the group consisting of 4,4-butylidene bis (3-methyl 6-tertiary butyl phenol), tertiarybutyl catechol, 2,6-di-tertiary butyl-paracresol, 2,2'-thio-bis (4-methyl-6-tertiary butyl phenol), 4,4'-thiobis(6-tertiary, butyl-meta-cresol), para-para'-isopropylidenediphenol, 2,4-dimethyl - 6 - tertiary butyl phenol, 2-2'-methylene-bis(4-methyl - 6 - tertiary butyl phenol) and mixtures thereof.
5. The composition in accordance with claim 1 wherein said stabilizer is represented by the formula R—S—S—R' wherein R and R' are selected from the group consisting of N-morpholinyl, N-piperidyl, N-tetrahydroquinolinyl, N-thiazolidyl, N-piperazyl, N-pyrrolidyl, N-oxazolidyl, N-imidazolyl, and mixtures thereof and which further includes and antioxidant material selected from the group consisting of 4,4-butylidene bis (3-methyl 6-tertiary butyl phenol), tertiary butyl catechol, 2,6-di-tertiary butyl-para-cresol, 2,2'-thio-bis(4-methyl-6-tertiary butyl phenol), 4,4'-thiobis(6-tertiary butyl meta-cresol), para-para'-isopropylidenediphenol, 2,4-dimethyl-6-tertiary butylphenol, 2,2'-methylenebis(4-methyl-6-tertiary butyl phenol) and mixtures thereof.

References Cited

UNITED STATES PATENTS

| 2,892,805 | 6/1959 | Tomlin et al. | 260—41.5 |
| 2,448,799 | 9/1948 | Happoldt, Jr. et al. | 260—23 |
| 2,967,850 | 1/1961 | Hawkins et al. | 260—41 |
| 2,988,533 | 6/1961 | Kibler | 260—45.8 |
| 3,062,887 | 11/1962 | Levering et al. | 260—583 |
| 3,329,645 | 7/1967 | Childers | 260—33.6 |
| 3,392,142 | 7/1968 | Leyland et al. | 260—45.8 |
| 3,379,678 | 4/1968 | Greco et al. | 260—45.8 |
| 3,038,878 | 6/1962 | Bell et al. | 260—45.85 |
| 3,144,422 | 8/1964 | Homberg | 260—23 |
| 3,174,946 | 3/1965 | Van Schooten | 260—45.95 |
| 3,190,852 | 6/1965 | Doyle | 260—45.85 |
| 3,216,967 | 11/1965 | Hawkins et al. | 260—45.9 |
| 3,244,650 | 4/1966 | Hecker et al. | 260—23 |

FOREIGN PATENTS

| 929,435 | 6/1963 | Great Britain | 260—45.95 |

DONALD E. CZAJA, Primary Examiner

R. A. WHITE, Assistant Examiner

U.S. Cl. X.R.

260—45.8 NZ, 45.8 SN, 45.95